(12) United States Patent
Tanaka et al.

(10) Patent No.: US 6,700,681 B1
(45) Date of Patent: Mar. 2, 2004

(54) IMAGE TRANSMITTING DEVICE

(75) Inventors: Joji Tanaka, Osaka-fu (JP); Kazuyuki Murata, Kyoto-fu (JP); Takehito Yamaguchi, Osaka-fu (JP); Hideyuki Kuwano, Osaka-Fu (JP); Yuji Okada, Hyogo-ken (JP); Naoki Takahashi, Osaka-fu (JP); Kenji Hisatomi, Osaka-fu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/476,783

(22) Filed: Dec. 30, 1999

(30) Foreign Application Priority Data

Jan. 11, 1999 (JP) ............................................ 11-003891

(51) Int. Cl.$^7$ ................................................ H04N 1/00
(52) U.S. Cl. ...................................... 358/405; 358/437
(58) Field of Search ................................ 358/400, 401, 358/403, 405, 435, 436, 437; 379/100.01, 100.04, 100.06, 100.09

(56) References Cited

U.S. PATENT DOCUMENTS

| | | | | |
|---|---|---|---|---|
| 4,356,485 A | * | 10/1982 | Boschulte | 340/825.17 |
| 4,975,783 A | * | 12/1990 | Takaoka | 358/404 |
| 5,638,384 A | * | 6/1997 | Hayashi | 371/37.1 |
| 6,262,805 B1 | * | 7/2001 | Ishikawa | 358/1.15 |

FOREIGN PATENT DOCUMENTS

| | | | | |
|---|---|---|---|---|
| JP | 2-41071 | | 2/1990 | ............ H04N/1/32 |
| JP | P2000-209418 | * | 7/2000 | ............ H04N/1/32 |
| JP | P2001-119416 | * | 4/2001 | ............ H04L/12/40 |

* cited by examiner

*Primary Examiner*—Jerome Grant, II
(74) *Attorney, Agent, or Firm*—McDermott, Will & Emery

(57) ABSTRACT

An image data communication apparatus for sending or receiving image data to or from the destination's or destination image data communication apparatus image data communication apparatuses connected thereto via telecommunication line, network or the like. The apparatus is so configured that image data outputting means 1 outputs a communication results report containing information on the ongoing communication in case a communication error occurs while an document image data is being sent to the destination's image data communication apparatus connected to the sender via communication means 15 and the image data restarts to be sent on the basis of information on the communication written in the communication results report when a communication results report is inputted from image data inputting means 2. And it is so arranged that the information on the communication written in the communication results report can be specified and modified by operating means 7 after the communication results report is inputted from image data inputting means 2 and before the sending is restarted.

7 Claims, 12 Drawing Sheets

FIG. 7(III)
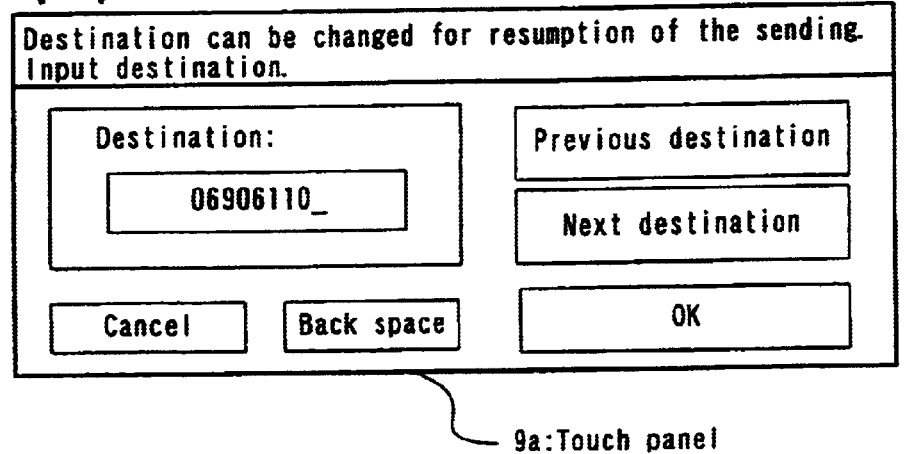

FIG. 8(III)
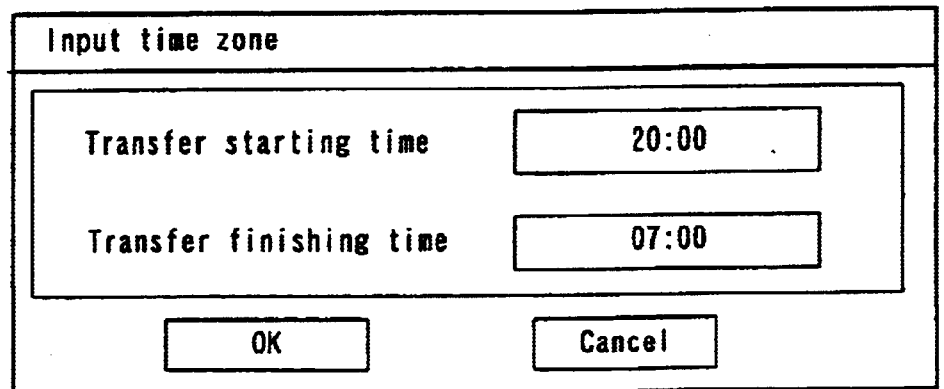

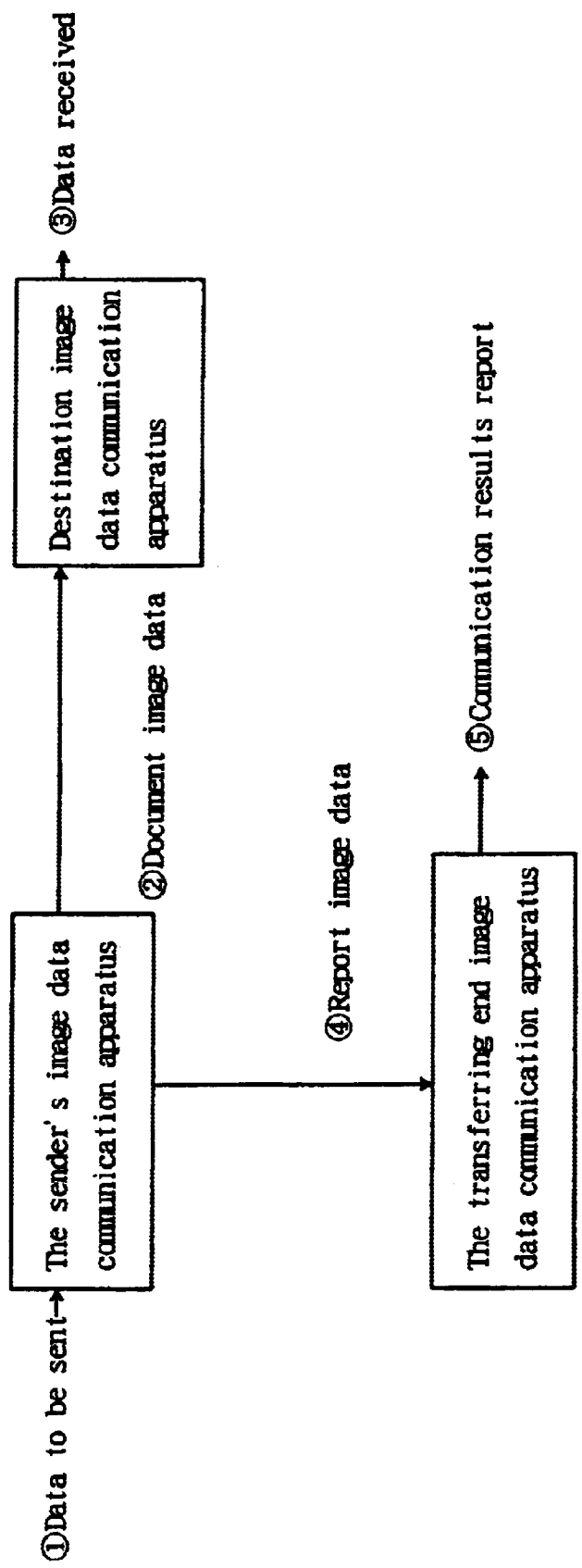

(II) Process of re-sending document image data accompanied by the transferring of the report image data

IMAGE TRANSMITTING DEVICE

BACKGROUND OF THE INVENTION

1. Field of the Invention

The present invention relates to image data communication apparatuses which are connected to each other via the telecommunication line, network or the like, and between which, image data are sent and received. More specifically, the present invention relates to image data communication apparatuses that permit resumption of sending image data through simple procedures in case a communication error and interruption occur while image data are being sent from one communication apparatus to another.

2. Description of the Prior Art

While data read as image data from a scanner or the like are being sent from one image data communication apparatus to another, communication errors can occur with the sending interrupted because of some effects of the communication conditions in the data transmission line, reception conditions of the apparatus at the destination or the like.

In such a case, the sending process has to be restarted to send the remaining part of image data—the part left unsent. But before the sending is to be resumed, the remaining part of data that has failed to be sent is placed on the scanner or the like the user judges from which page of data the sending has to be resumed—and it is necessary to input again information for resumption of the sending including the subscriber's number of the destination apparatus.

An image data communication apparatus which is claimed to solve such problems is disclosed in Japanese patent application laid open under No. 2-41071. In that apparatus, it is so arranged that in case a communication error is caused, a communication results sheet containing information on the ongoing communication is outputted. On the basis of that results sheet, the sending will be restarted. Here are further details of this prior art apparatus, which will be described with reference to FIG. 11.

(Data sending procedure)

Data to be sent is set on a reader 102 with information including the subscriber's number or dialing information of the destination inputted on an operator panel 101, and the sending is started. In case an communication error arises in the course of the sending an OCR (optical character reader) output controller 109 will print out an OCR sheet or communication results sheet containing information such as the number of the last page sent at the time of communication interruption and the subscriber's number of the destination.

(Resumption of sending)

The data to be sent is placed on the reader 102 with the OCR sheet at the top as first page of the data and an instruction to start sending is inputted from the operator panel 101. Then an OCR recognizer 107 converts such characters as the page number and the subscriber's number into character codes. According to these character codes, the sending is restarted thereby sending the part left unsent of the image data at the subscriber number.

In the prior art image data communication apparatus just described, the sending can be restarted even from a halfway page of the data However, a problem with the prior art apparatus is that if inputted information such as the subscriber's number is wrong, the sending based on the printed OCR sheet will fail to be resumed. In other words, if there are mistakes in information including the subscriber's number contained in the OCR sheet, the data sending can not be re-established.

The sending procedure has to be taken from the start by placing the part left unsent of the data and inputting information including the subscriber's number of the destination.

Another problem with the prior art is that since all information necessary for the resumption of sending is carried on the OCR sheet, it can happen that the necessary information can not be accommodated in a one-page OCR sheet when data is to be sent to more than one destination image data communication apparatuses.

SUMMARY OF THE INVENTION

The present invention is made to bring about a solution to the problems encountered with the prior art. Accordingly, it is an object of the present invention to provide an image data communication apparatus that permits resumption of sending image data through a simplified procedure even if a communication error is caused by wrong information inputted for the sending That is, the present invention is built on an image data communication apparatus in which, as shown in FIG. 1, in case a communication error occurs while an image data is being sent to another image data communication apparatus connected with the sender or source apparatus via communication means 15, image data outputting means 1 outputs a communication results report including information on the sending and when the communication results report is inputted from image data inputting means 2, the sending of the image data will be resumed on the basis of information on the sending written on that report.

The image data communication apparatus is so configured that before the sending is restarted after the communication results report is inputted from the image data inputting means 2, operating means 7 can change and input information on the sending That makes it possible to resume and complete the sending according to the communication results report even if a communication error is caused because there is a mistake in information on the destination inputted from the operator panel 9.

A job control table 17 stores information on the communication, relating that to a particular job identification (ID) given every sending. The image data outputting means 1 outputs a communication results report carrying a mark corresponding to the job ID in place of the information on the sending. Thus, information necessary for resumption of sending carried on the communication results report can be condensed into a mark corresponding to the job ID. That solves the problem encountered with the prior art that it can happen that information necessary for the resumption of the sending can not be accommodated in a one-page communication results report.

Furthermore, storage means 16 memorizes an image data to be sent; the job control table 17 stores information to specify the image data in the storage means 16, relating that to the job ID; and the communication means 15 sends out the image data corresponding to the mark put on the communication results report. That permits resumption of the sending without using, that is, referring to the image data to be sent.

Instead of the image data outputting means 1 outputting the communication-results report, it is possible to so arrange that the communication means 15 transfers the image data corresponding to the communication results report to some other image data communication apparatus. That makes it possible to know communication results at any image data communication apparatus. It is desired that such a transferring should be effected at a certain time during the time zone specified from the operating means 7.

It is also so configured that when an image data corresponding to the communication results report is received from the transferring end image data communication apparatus, the sending is restarted.

DESCRIPTION OF THE PREFERRED EMBODIMENTS

Figure 1:
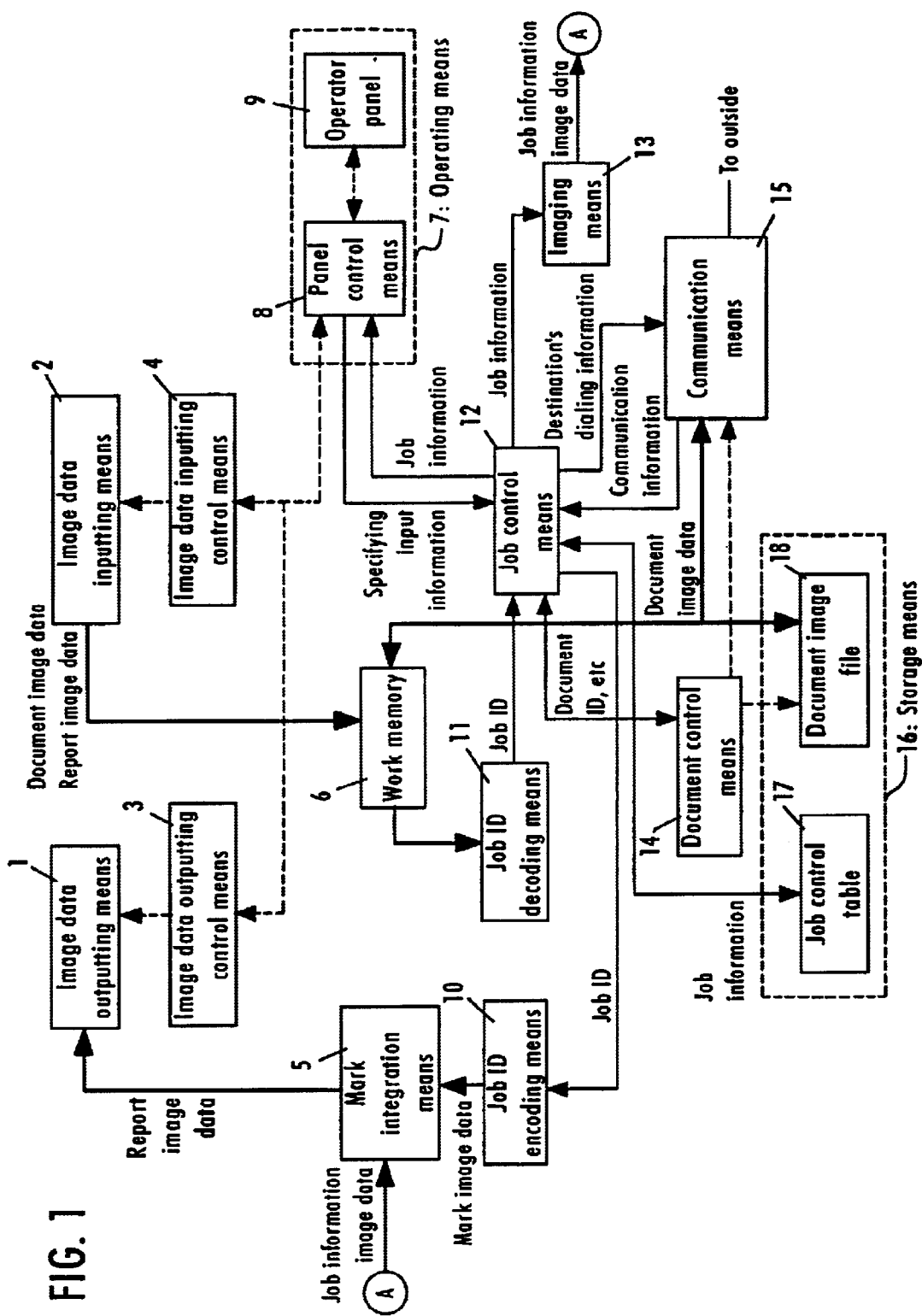
FIG. 1 is a schematic functional block diagram of an image data communication apparatus of a first embodiment of the present invention.

Reference is made to FIG. 1 that is a schematic functional block diagram of a digital combination unit or image data communication apparatus. The configuration of the apparatus will be described with reference to the flow charts in FIG. 3 and FIG. 4.

(Data sending procedure)

Figure 6:
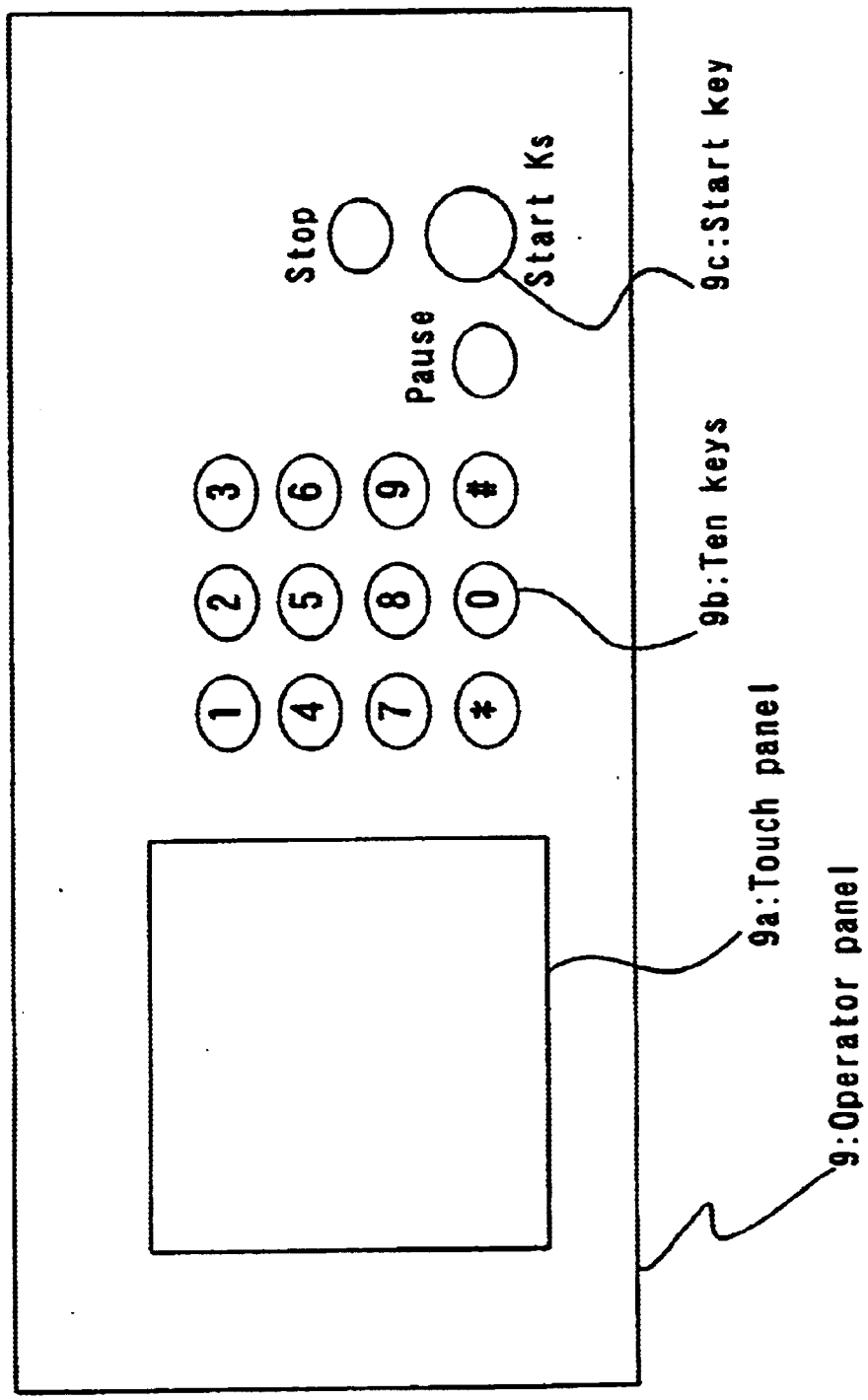
FIG. 6 is a schematic exterior view of an operator panel of the present invention.

The dialing information, for example dialing number of the destination, is inputted from the operator panel 9 by means of a touch panel 9a, ten keys 9b, start key 9c or the like as shown in FIG. 6 with the sending image data set on a document feeder (ADF) provided in image data inputting means 2. Then, dialing information of the destination is retained by a panel control means 8.

When the start key 9c on the operator panel 9 is pressed down, the panel control means 8 issues a request to read an image data to an image data inputting control means 4 that controls the drive of the image data inputting means 2, and also makes a request to the job control means 12 to send the dialing information of the destination or destination as well as the document image data.

Figure 3:
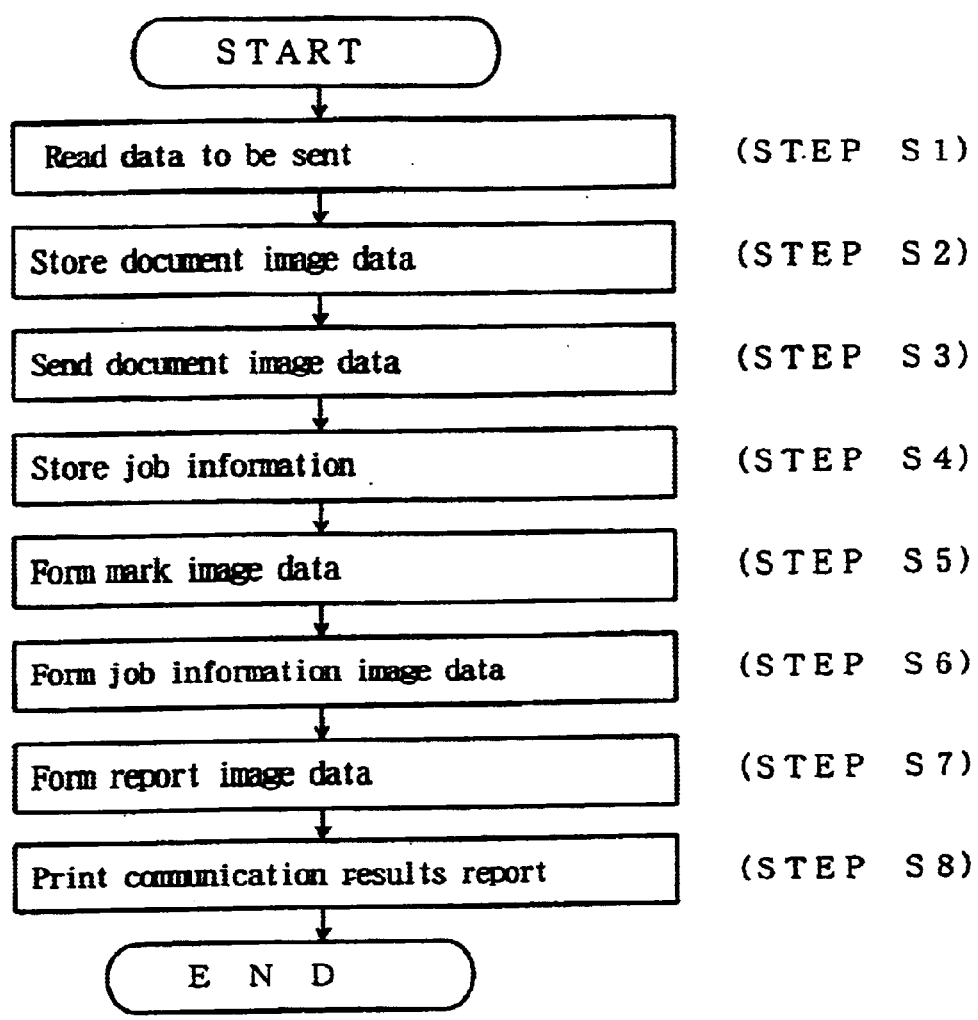
FIG. 3 is a flow chart of the sending process in the first embodiment of the present invention

Receiving a request to read, the image data inputting control means 4 instructs the image data inputting means 2 to read the image data for sending. So instructed, the image data inputting means 2 feeds the image data for sending containing a plurality of pages placed on ADF and stores them as digitally converted document image data in the work memory 6 (FIG. 3, Steps S1).

Meanwhile, the job control means 12, which receives the send request, issues a particular job ID for every sending such as, for example, "00000001" and informs the document control means 14 to the effect that a request is made to send the document image data. At the same time, the dialing information of the destination is handed over to communication means 15. Informed that the send request is received, the document control means 14 issues a document ID, for example, "00000001" for every document image data and hands over the document ID to the job control means 12 and at the same time stores the document image data, which is stored in the work memory 6, in storage means 16 such as hard disk as document image file 18. When the storage is completed, the document control means 14 informs the communication means 15 to the effect. So informed, the communication means 15 starts to send the document image data stored in the work memory 6 to the other communication apparatus (such as a facsimile unit) corresponding to the dialing information of the destination. When the sending is over, the communication results (communication information) is handed over to the job control means 12 (FIG. 3, Steps S2–S3).

Figure 5:
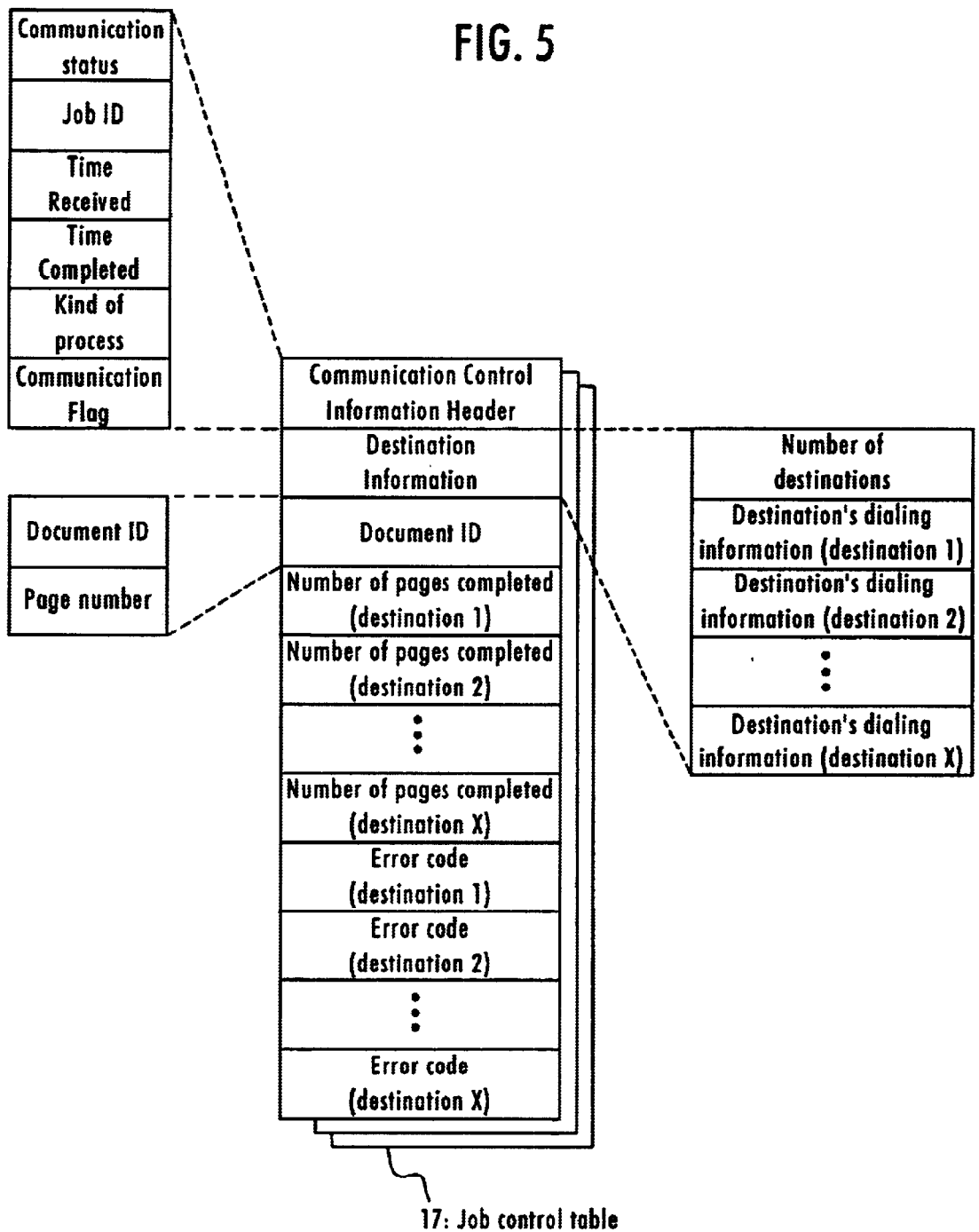
FIG. 5 is an internal arrangement on the job control table of the present invention.

Receiving the communication information, the job control means 12 stores that information and the document ID—which is received from the document control means 14—on the job control table 17 as shown in FIG. 5, relating them to the job ID. Then, job control means 12 hands over the job ID to the job identification encoding means 10 and refers the information, which is stored related to the job ID on the job control table 17, to the imaging means 13 (FIG. 3, Step S4).

Receiving the job ID, the job identification encoding means 10 forms a mark image data such as, for example, a bar code, corresponding to the job ID and refers the mark image data to mark integration means 5. Meanwhile, the imaging means 13, which has received the job information, forms a job information image data corresponding to that information or character information and delivers this job information image data to the mark integration means 5 (FIG. 3 Steps S5–S6).

Receiving the mark image data and job information image data, the mark integration means 5 produces a job information image data at a specific position on the paper and a mark image data-integrated image data (hereinafter referred to as "report image data") at another specific position of the paper. This report image data is then handed over to the image data outputting means 1 such as a laser printer (FIG. 3, Steps S7–S8).

Figure 9:
FIG. 9 is a schematic exterior view of a communication results report of the present invention.

After that process is passed through, a communication results report (as shown in FIG. 9) provided with a job ID mark M is printed, with the sending process coming to an end.

(Resumption of sending)

If a communication error occurs in the course of the sending process, the sending will be re-started using the communication results report printed out in that process.

There will now be described the process of resuming the sending using the communication results report printed out when a wrong dialing number, say, "069061111" was inputted instead of a correct dialing number, say, "069061110."

First the start key 9c is pressed with the communication results report set on ADF provided in the image data inputting means 2. Then, the panel control means 8 requests the image data inputting control means 4 to read in the communication results report and delivers to the job control means 12 a request to re-send the document image data. Requested to read, the image data inputting control means 4 directs the image data inputting means 2 to read in the communication results report. So directed, the image data inputting means 2 feeds the communication results report set on ADF to the document glass, and stores the same in the work memory 6 as digitized report image data (FIG. 4, Step S11).

Meanwhile, the job control means 12, which has been requested to restart the sending directs the job ID decoding means 11 to decode the report image data stored in the work memory 6. So directed, the job ID decoding means 11 does decoding at a specific position on the report image data, the specific position corresponding to the position where the mark image data was integrated in the preceding sending The job ID acquired from this decoding is referred to the job control means 12. That decoding technique is widely known and will not be described in detail (FIG. 4, Step S12).

Now, the digital combination unit of the present invention is so configured that before the sending is to be restarted, the user can check and modify the information for the re-sending (job information) —including adding, erasing or the like. In the following, there will be described the process of changing a wrong dialing information or number, say, "06906111", which was mistakenly inputted in the first sending process, to a correct dialing number of the destination, say, "069061110."

Figure 4:
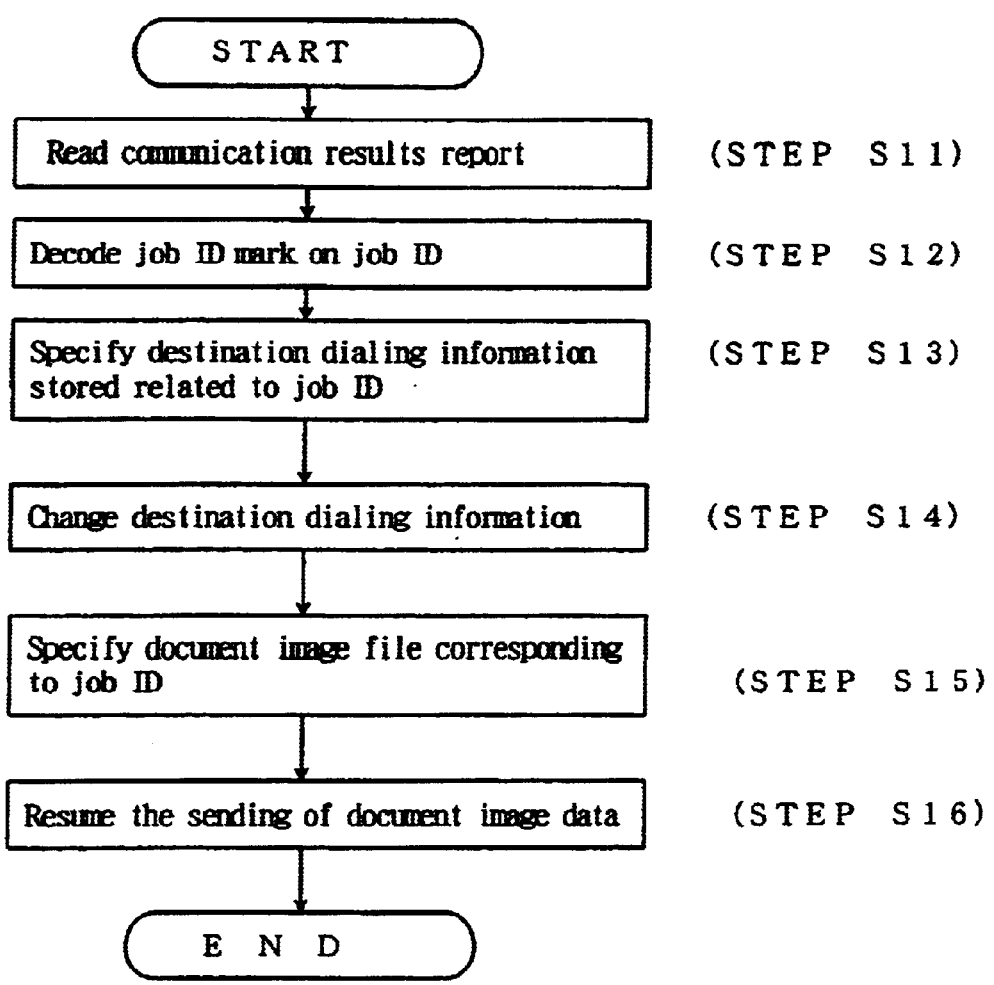
FIG. 4 is a flow chart of the re-sending process in the first embodiment of the present invention.

Receiving the job ID, the job control means 12 searches the job control table 17 and finds out the destination's dialing number "069061111" (FIG. 4. Step S13). Then, the destination's dialing information is referred to the panel control means 8. Accepting the destination's dialing information, the panel control means 8 displays that information on the touch panel 9a (FIG. 7).

Figure 7I:
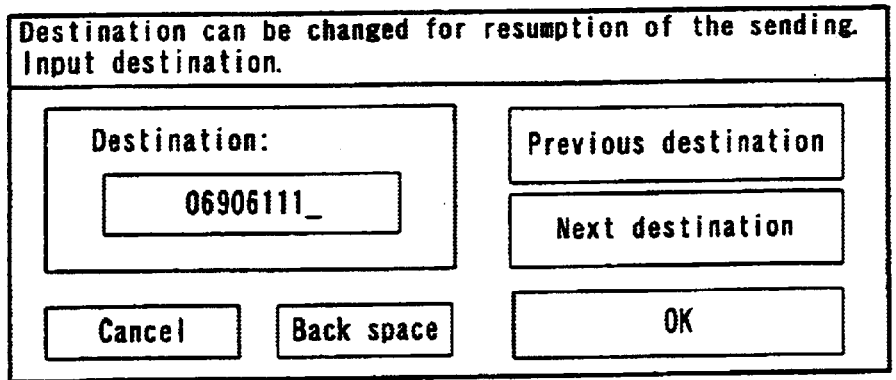
FIG. 7 is views showing changes on the panel dialog box as destinations are changed in the re-sending process of the present invention.
Figure 7:
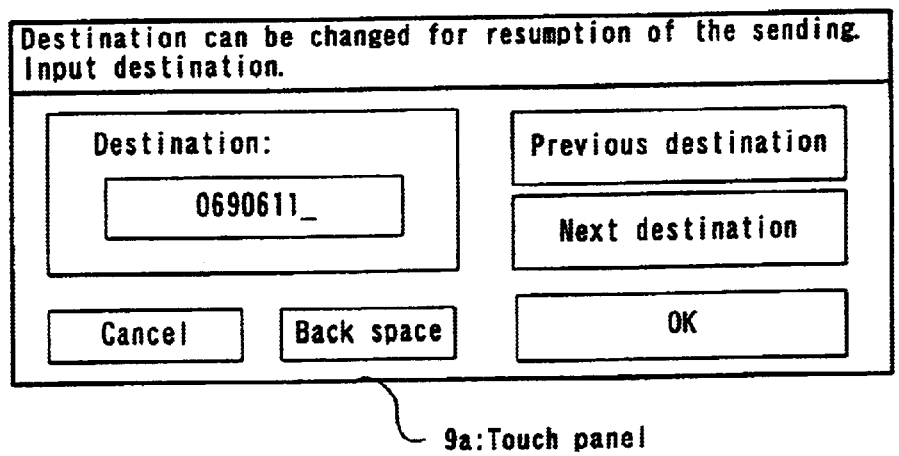

First, the back space key is pressed on the dialog box for changing destinations as shown in (FIG. 7(I)–FIG. 7(II)), thus the cursor is moved back to where the last figure "1" of the dial number "0669061111" is displayed. Then, the number "0" among the ten keys 9b on the operator panel 9 is pressed as shown in (FIG. 7(II)–FIG. 7 (III)). Then, if the key "OK" is pressed, the destination's correct dialing number "069061110" is retained by the panel control means 8. Then if the start key 9c on the operator panel 9 is pressed, the destination's dialing number "069061110" will be handed over to the job control means 12 by the panel control means 8.

Then, the job control means 12 changes the destination's dialing number "069061111"—which is stored related to the job ID in the job control table 17—to the destination's correct dialing number "069061110" (FIG. 4, Step S14). Then, the destination's correct dialing number "069061110" is referred to the communication means 15 and at the same time, the document ID stored related to the job ID on the job control table 17 is handed over to the document control means 14.

Accepting the document ID, the document control means 14 reads out the document image file 18 corresponding to the document ID from the storage means 16 and stores the same on the work memory 6 as document image data Upon receiving the destination's dialing number "069061110," the communication means 15 starts to send the document image data, which is stored on the work memory 6, to the destination's image data communication apparatus corresponding to the destination's dialing information (FIG. 4, Steps S15–S16).

As set forth above, it is so arranged in the digital combination unit of the present invention that before the sending is to be restarted, the user can check and change information for the resending Therefore, even if a communication error is caused because of mistakes in the destination's dialing information inputted from the operator panel 9, the re-sending using the communication results report can be brought normally to an end.

It is also noted that the information necessary for re-sending out of the information carried on the communication results report is limited to the job ID mark M. That solves the problem encountered with the prior art that it can happen that information necessary for re-sending can not be accommodated in one page. By the way, the job information carried on the communication results report is for the user to check and has nothing to do with the re-sending.

The process of changing the destination's dialing information to restart the sending has been described. In case changing the destination's dialing information is not involved in the process of restarting the sending, the document image data that failed to be sent only is taken up for the re-sending procedure. In other words, it is so arranged that the job control means 12 at Step 14 in FIG. 4 (where the destination's dialing information is not changed) hands over to the document control means 14 the document ID and information on the number of pages successfully sent prior to the communication error occurred. And the document control means 14 reads out from the storage means 16 the document image data of the pages left unsent, which is contained in the document image file 18 corresponding to the document ID.

The process of restarting to send image data to a one destination's image data communication apparatus has been described. The present invention can also cope with the process of restarting to send image data to a plurality of other image data communication apparatuses. Namely, during the process of sending to a plurality of other image data communication apparatuses when an erroneous dialing information of a particular party's image data communication apparatus should halt sending to the entire image data communication apparatuses, the document image data left unsent alone will be sent to all the image data communication apparatuses except for the one belonging to aforesaid particular party.

(Embodiment 2)

The preceding first embodiment is so configured that a communication results report is to be printed out from the image data outputting means 1 of the image data communication apparatus (digital combination unit) which sends out image data. It can happen that the user wants the communication results report to be printed out from some other image data communication apparatus. In sending data at night using an automatic sending function—a function to start the sending at a preset time—provided in the digital combination unit, for example, the communication results can be obtained at some other place, the user's home, for example, if the communication results report can be printed out at some other image data communication apparatus, for example, a facsimile machine installed at the user's home.

Figure 2:
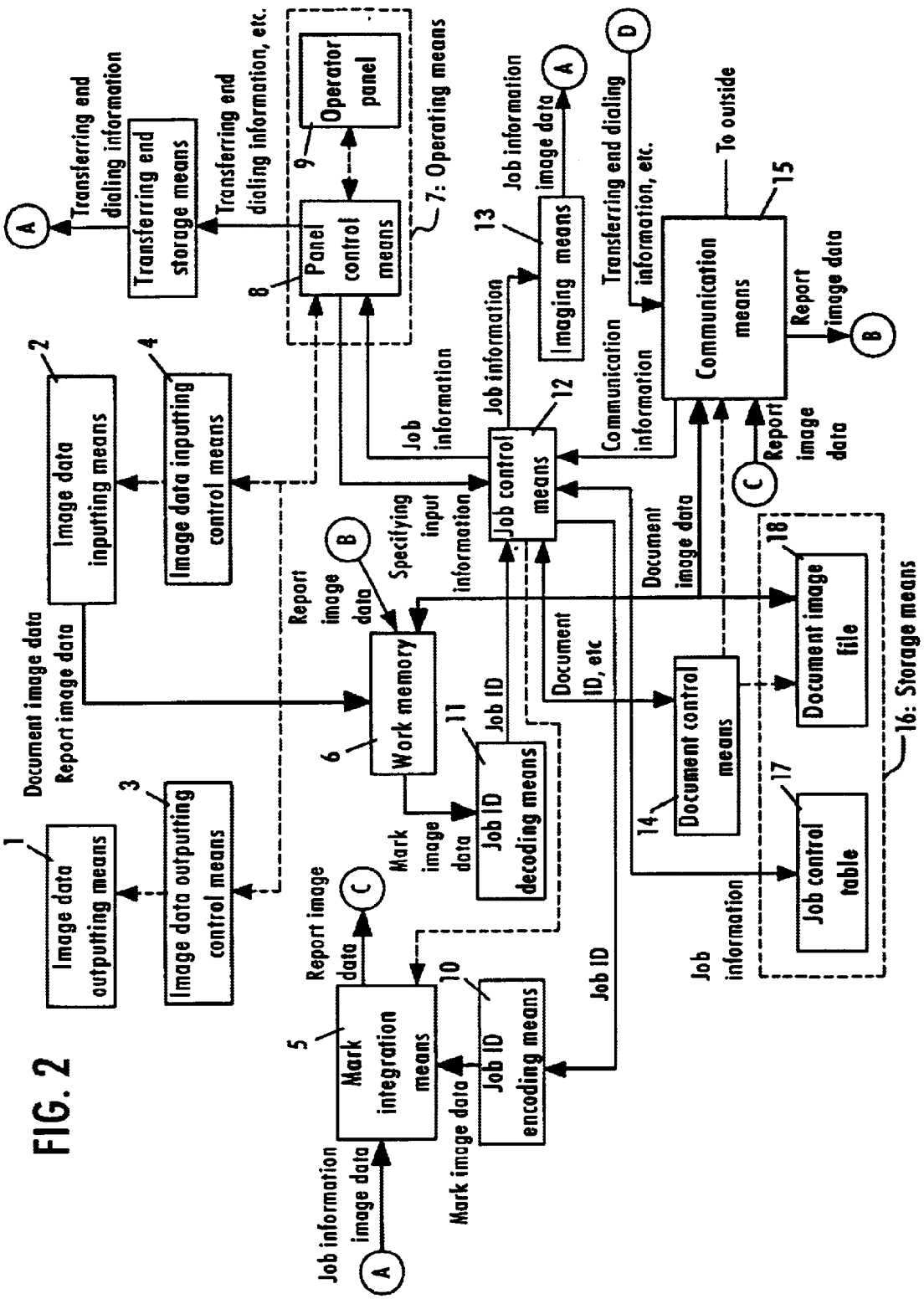
FIG. 2 is a schematic functional block diagram of an image data communication apparatus of a second embodiment of the present invention.

Now, the arrangement of the digital combination unit in the present embodiment will be explained with the description limited to the points different from those of the first embodiment with reference to FIG. 2.

(Setting of report transferring)

Figure 8I:
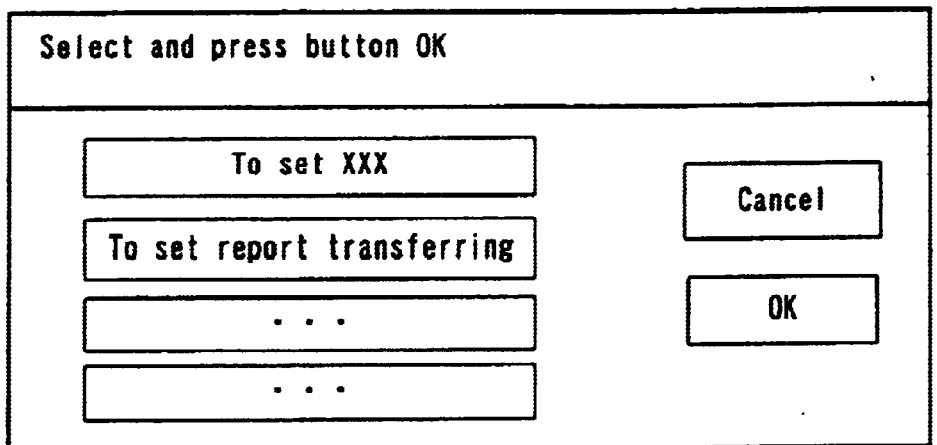
FIG. 8 is views showing changes on the panel dialog box for transferring of a report in the present invention.
Figure 8:
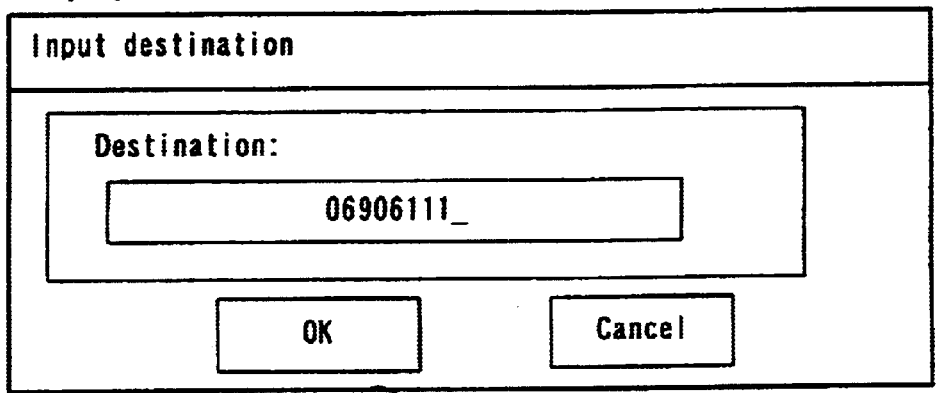

In the present embodiment, prior to the process of sending document image data accompanied by the transferring of the report image data (which will be described later), the transferring of the report is set as explained in the following When the setting key in the initial dialog box (not shown) on the touch panel 9a is pressed, the setting menu dialog box as shown in FIG. 8(I) will appear. On this dialog box, "Report transferring setting" is selected and the key "OK" is pressed, and then the dialog box for setting the transferring end as shown in FIG. 8(II) will come out. If the dialing information of the transferring end is inputted on the dialog box for setting the transferring end and the key "OK" is pressed, and then the dialog box for setting the transferring time zone as shown in FIG. 8(III) will appear. On this dialog box, the transferring starting time and ending time are inputted and the key "OK" is pressed, and then the initial dialog box will come out with the report forwarding setting completed.

The setting done in the aforesaid procedure is stored in the transferring end storage means 19 via panel control means 8. From this time on, the process of sending image data will be accompanied by the transferring of the report image data as described below if the procedure for the sending is initiated.
(Process of sending image data accompanied by the transferring of report image data)

Figure 10B:
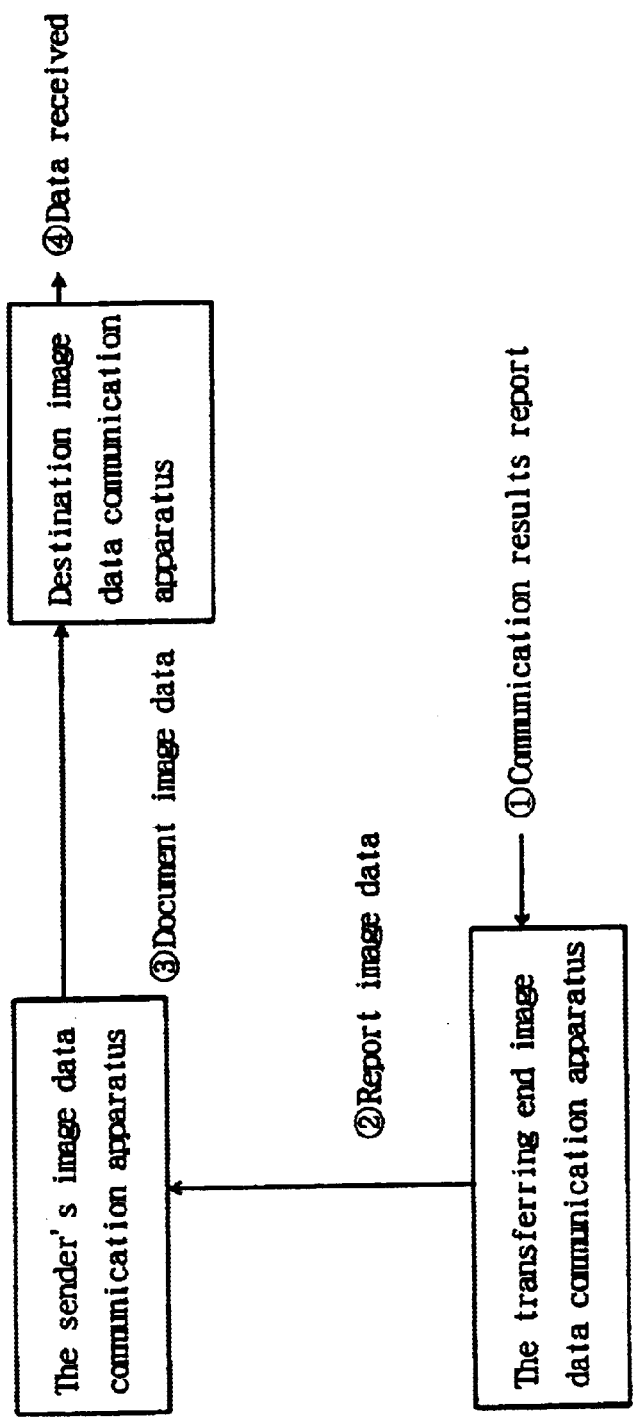
FIG. 10 is explanatory diagrams of the sending process and resending process in the second embodiment of the present invention.
Figure 11:
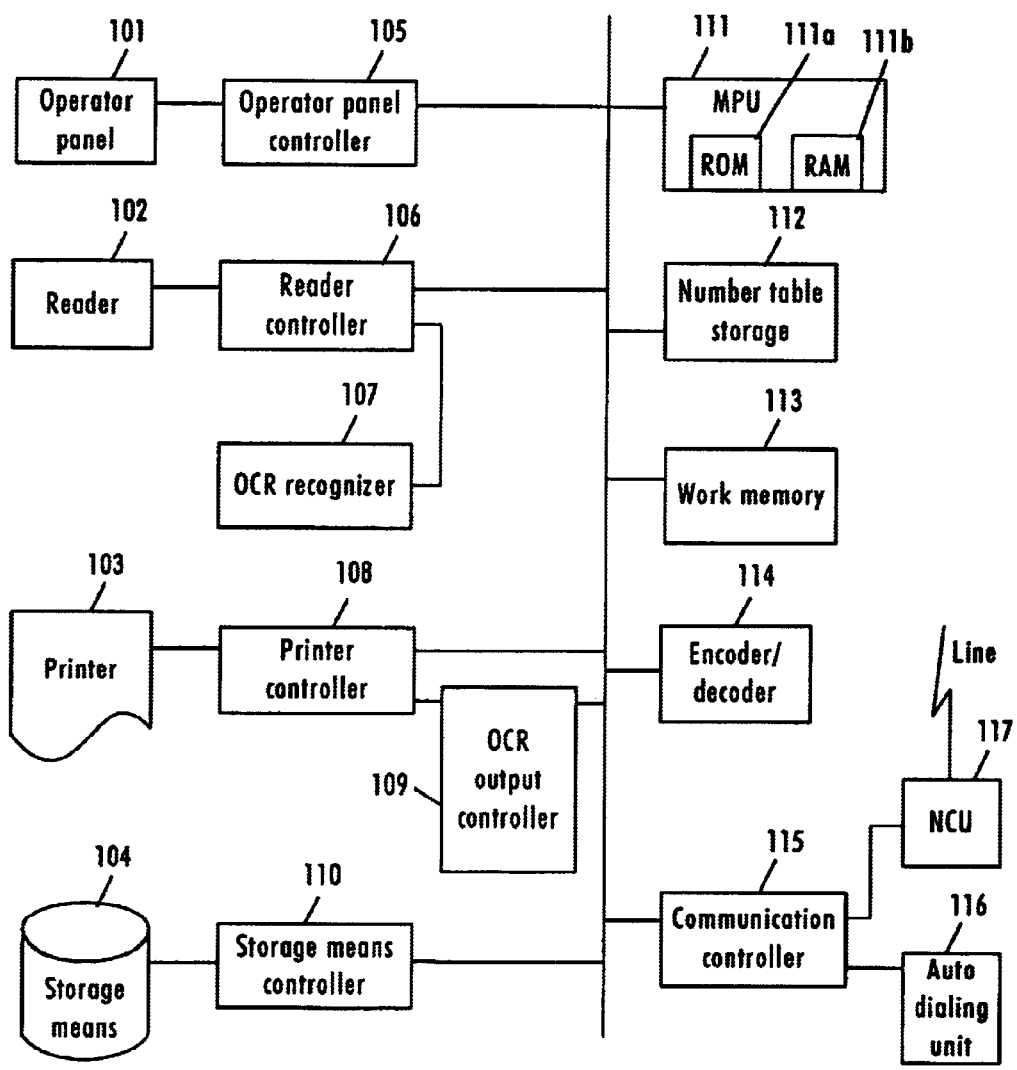
FIG. 11 is a schematic functional block diagram of the prior art image data communication apparatus.

Reference is made to FIG. 10(A) which shows the process of a transferring end image data communication apparatus, a facsimile unit installed at the user's home, for example, printing out a report image data made out when data is sent from the sender's image data communication apparatus like a digital combination unit (to which the present invention is applied) to the destination image data communication apparatus of the destination.

The present embodiment is identical with that of the first embodiment in the process from the completion of the sending of document image data to the step of the job control means 12 storing job information in the job control table 17.

That is, the panel control means 8 issues a request to the image data inputting control means 4 to read the data to be sent and makes a request to the job control means 12 to send the document image data along with the destination's dialing information. Receiving the request to read the data, the image data inputting means 2 stores data to be sent in the work memory 6 as digitized document image data. Meanwhile, the job control means 12, which has received the request to send the data, issues a job ID and informs the document control means 14 to the effect that a request is made to send the document image data stored in the work memory 6. At the same time, the job control means 12 hands over the destination's dialing information to the communication means 15. Informed that the aforesaid request to send data is received, the document control means 14 first issues a document ID, and hands this document ID to the job control means 12. At the same time, the document control means 14 stores in the storage means 16 the document image data kept on the work memory 6. When the storage is completed, the document control means 14 will inform the communication means 15 to the effect. So informed, the communication means 15 starts to send the document image data stored on the work memory 6 to the destination's image data communication apparatus corresponding to the destination's dialing information. When the sending is over, the communication results communication information) are delivered to the job control means 12. Receiving the communication information, the job control means 12 stores on the job control table 17 the communication information and the document ID received from the document control means 14, relating the aforesaid job ID thereto (FIG. 10(A), ①→②→③).

Here, the job control means 12 refers to the contents stored in the transferring end storage means 19. In case the time at the moment is in the transferring time zone—a period from the start of sending of the data stored in the transferring end storage means 19 to the end of the sending of the same—, the job control means 12 informs the mark integration means 5 to that effect and at the same time hands over to the communication means 15 the dialing information of the transferring end stored in the transferring end storage means 19. (In case no dialing information of the transferring end is stored or in case the time at the moment is not in the sending zone, the process will be the same as in the first embodiment.

The subsequent steps to follow up to the step where the mark integration means 5 produces report image data are the same as those in the first embodiment.

In other words, the job control means 12 refers the job ID to the job identification encoding means 10 and at the same time hands over to the imaging means 13 the job information stored, related to the job ID, on the job control table 17. Then, the job identification encoding means 10 forms a mark image data, while the imaging means 13 creates a job information image data. Then, the mark integration means 5 integrates the mark image data and the job information image data into a report image data.

Here, the mark integration means 5, which has been informed by the job control means 12 to the effect that the transferring end dialing information is stored in the transferring end storage means 19, refers the created report image data to the communication means 15. Receiving the report image data, the communication means 15 sends the report image data along with a request to print to the transferring end image data communication apparatus corresponding to the transferring end dialing information (FIG. 10(A), ④).

That is followed by the transferring end image data communication apparatus printing a communication results report, bringing the sending process to an end (FIG. 10(A), ⑤).
(Process of re-sending document image data accompanied by the transferring of report image data)

In case a communication error occurs in the course of the process of sending document image data accompanied by the transferring of report image data, re-sending can be effected using the communication results report printed from the transferring end image data communication apparatus.

To illustrate, in the transferring end image data communication apparatus, the dialing information on the sender's image data communication apparatus is specified and inputted, with the communication results report set in an image data inputting means (not shown). Then a digitized report image data is sent to the sender's image data communication apparatus FIG. 10(B), ①→②).

The communication means 15 in the sender's image data communication apparatus, which has received the report image data, stores that data in the work memory 6 and issues to the job control means 12 a request to re-send the document image data Receiving the request for re-sending the job control means 12 instructs the job ID decoding means 11 to decode the report image data stored in the work memory 6 as described above. So instructed, the job ID decoding means 11 decodes the report image data at a specific position and hands over to the job control means 12 a job ID obtained from the decoding.

The job control means 12, which has received the job ID, delivers to the communication means 15 the destination's dialing information stored related to that job ID on the job control table 17.

At the same time, the job control means 12 hands over to the document control means 14 the document ID stored related to that job ID on the job control table 17.

Receiving the document ID, the document control means 14 reads out a document image file 18 corresponding to document ID from the storage means 16 and stores the same as document image data in the work memory 6. The communication means 15, which has received the destination's dialing information, starts to send the document image data stored in the work memory 6 to the destination's image data communication apparatus corresponding to the destination's dialing information FIG. 10(B), ③→④).

In the present embodiment, as set forth above, it is so arranged that communication results reports can be printed out from a transferring end image data communication apparatus and that the process of re-starting the sending can be effected from the transferring end image data communication apparatus using the communication results reports. Sending document image data using the automatic sending function as at night can be promptly taken care of as from a facsimile unit installed at the user's home.

In the "process of re-sending document image data accompanied by the transferring of report image data," it is so arranged that the dialing information on the sender's image data communication apparatus is specified and inputted in the transferring end image data communication apparatus. It is desirable that this dialing information has been given from the sender's image data communication apparatus to the sidetracking end image data communication apparatus.

In other words, if it is so configured that the communication means of the sender's image data communication apparatus sends the dialing information of its own image data communication apparatus along with the report image data (or sends report image data carrying the dialing information of its own image data communication apparatus) that will eliminate the need to specify and input the dialing information of the sender's image data communication apparatus at the transferring end image data communication apparatus.

Digital combination units and facsimile units are used in the preceding description The present invention is not limited thereto. Personal computers and the like can also be used.

It is also noted that in the preceding description, the document image data received at the destination's image data communication apparatus is to be printed out. The present invention is not limited thereto, but the document image data can be applied to various communication processes. For example, the present invention can be applied where the document image data is registered (stored) with a server unit (the destination's image data communication apparatus) connected to the sender via a network using the network communication function (communication means 15) provided in the usual digital combination unit. In this arrangement, communication results reports with the registration results written therein are printed from the digital combination unit.

As set forth above, the present invention is so configured that before the start of re-sending information on the communication can be changed and inputted. Even if a communication error occurs because of mistakes in the destination's dialing information inputted from the operator panel in the sending process, therefore, the sending can be resumed using the communication results report and brought to an end in a normal manner.

It is also noted that the information required for restarting the sending that is written on the communication results report can be limited to the ID mark alone. That eliminates the problem with the prior art that it can happen that the information required for restarting the sending can not be accommodated within a one-page communication results report.

Another feature is that it is so configured that document image data are stored in the storage means in the sending process, it is possible to resume the sending without referring to the data to be sent.

What is claimed is:

1. An image data communication apparatus wherein in case a communication error occurs while document image data is being sent to another image data communication apparatus connected to a sender via communication means, a communication results report containing information on that communication is outputted from image outputting means and wherein when the communication results report is inputted from the image outputting means, the sending is re-started on the basis of the information on the communication written in said communication results report, characterized in that there is provided operating means that permits modifying the information on the communication written in said communication results report after the communication results report is inputted from image data inputting means and before the sending is re-started.

2. The image data communication apparatus as defined in claim 1 wherein there is provided a job control table that stores information on said communication by relating the same to a specific job ID for every communication and wherein said image data outputting means outputs a communication results report with a mark placed thereon instead of the information on said communication, said mark corresponding to said job ID.

3. The image data communication apparatus as defined in claim 2 wherein there is provided storage means which stores image data for sending wherein said job control table stores information by relating the same to the job ID, the information being to specify image data in said storage means, and wherein said communication means sends image data stored in said storage means, said image data corresponding to said mark placed on the communication results report.

4. The image data communication apparatus as defined in claim 3 wherein said communication means sends to a transferring end image data communication apparatus the image data corresponding to the communication results report instead of the process of said image outputting means outputting a communication results report.

5. The image data communication apparatus as defined in claim 4 wherein said communication means sends to the transferring end image data communication apparatus the image data corresponding to the communication results report at a time within the time zone specified and inputted from operating means.

6. The image data communication apparatus as defined in claim 5 wherein said communication means resumes the sending of document image data upon receiving from the transferring end image data communication apparatus the image data corresponding to the communication results report.

7. The image data communication apparatus as defined in claim 1 wherein said destination's image data communication apparatus is a server unit that stores received image data.

* * * * *